US009697542B2

(12) United States Patent
Qiu et al.

(10) Patent No.: US 9,697,542 B2
(45) Date of Patent: Jul. 4, 2017

(54) SYSTEM FOR DEPLOYING VOICE OVER INTERNET PROTOCOL SERVICES

(71) Applicant: AT&T Intellectual Property I, L.P., Atlanta, GA (US)

(72) Inventors: Chaoxin Qiu, Austin, TX (US); Diana M. Cantu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 78 days.

(21) Appl. No.: 14/715,061

(22) Filed: May 18, 2015

(65) Prior Publication Data

US 2015/0248709 A1    Sep. 3, 2015

Related U.S. Application Data

(63) Continuation of application No. 11/765,135, filed on Jun. 19, 2007, now Pat. No. 9,036,621.

(51) Int. Cl.
| | | |
|---|---|---|
| *G06Q 30/02* | (2012.01) | |
| *H04W 4/02* | (2009.01) | |
| *H04L 29/06* | (2006.01) | |
| *H04L 29/08* | (2006.01) | |
| *H04M 7/00* | (2006.01) | |

(52) U.S. Cl.
CPC ..... *G06Q 30/0269* (2013.01); *H04L 65/1006* (2013.01); *H04L 65/1016* (2013.01); *H04L 65/4015* (2013.01); *H04L 67/18* (2013.01); *H04M 7/006* (2013.01); *H04W 4/02* (2013.01)

(58) Field of Classification Search
CPC . H04L 65/1016; H04L 65/4015; H04L 67/18; H04W 4/02; G06Q 30/0269
See application file for complete search history.

(56) References Cited

U.S. PATENT DOCUMENTS

| | | | |
|---|---|---|---|
| 4,811,382 A | 3/1989 | Sleevi | |
| 5,652,784 A | 7/1997 | Blen et al. | |
| 5,937,037 A | 8/1999 | Kamel et al. | |
| 6,009,150 A | 12/1999 | Kamel | |
| 6,456,601 B1 | 9/2002 | Kosdon et al. | |
| 7,292,683 B2 | 11/2007 | Taylor et al. | |
| 7,920,689 B2* | 4/2011 | Radziewicz ...... | H04M 3/42017 379/215.01 |
| 8,107,957 B1 | 1/2012 | O'Neil et al. | |
| 9,036,621 B2 | 5/2015 | Qiu et al. | |
| 2003/0014754 A1 | 1/2003 | Chang | |
| 2004/0001583 A1 | 1/2004 | Giaccherini et al. | |
| 2004/0083133 A1* | 4/2004 | Nicholas ................ | G06Q 30/02 705/14.52 |

(Continued)

*Primary Examiner* — Khaled Kassim

(57) ABSTRACT

A system for deploying Voice over Internet Protocol (VoIP) services is provided. A system that incorporates teachings of the present disclosure may include, for example, a Call Session Control Function (CSCF) having a controller element to receive a Session Initiation Protocol (SIP) message from an originating communication device requesting communications with a terminating communication device, and establish an Internet Protocol (IP) connection between the originating communication device and an advertisement media system to present at the originating communication device an advertisement message that replaces a ringback tone associated with the terminating communication device. Additional embodiments are disclosed.

20 Claims, 5 Drawing Sheets

(56) References Cited

U.S. PATENT DOCUMENTS

| | | | |
|---|---|---|---|
| 2004/0243623 A1* | 12/2004 | Ozer | G06Q 30/02 |
| 2006/0026067 A1* | 2/2006 | Nicholas | G06Q 30/00 |
| | | | 705/14.58 |
| 2007/0104184 A1* | 5/2007 | Ku | H04L 29/1216 |
| | | | 370/352 |
| 2007/0116227 A1* | 5/2007 | Vitenson | H04M 3/4878 |
| | | | 379/207.02 |
| 2007/0116251 A1* | 5/2007 | Seo | H04M 1/253 |
| | | | 379/372 |
| 2007/0121595 A1* | 5/2007 | Batni | H04M 3/42017 |
| | | | 370/356 |
| 2007/0189474 A1* | 8/2007 | Cai | G06Q 30/02 |
| | | | 379/142.01 |
| 2007/0271145 A1* | 11/2007 | Vest | G06Q 30/02 |
| | | | 705/14.41 |
| 2008/0037717 A1 | 2/2008 | Seelig et al. | |
| 2008/0120176 A1* | 5/2008 | Batni | G06Q 30/0211 |
| | | | 705/14.13 |
| 2008/0181225 A1* | 7/2008 | Zampiello | H04L 12/1859 |
| | | | 370/390 |
| 2008/0220747 A1 | 9/2008 | Ashkenazi et al. | |
| 2008/0221985 A1* | 9/2008 | Civanlar | G06Q 30/02 |
| | | | 705/14.56 |
| 2010/0135473 A1 | 6/2010 | Dewing et al. | |

\* cited by examiner

SYSTEM FOR DEPLOYING VOICE OVER INTERNET PROTOCOL SERVICES

This application is a continuation of U.S. patent application Ser. No. 11/765,135, filed Jun. 19, 2007, now U.S. Pat. No. 9,036,621, which is herein incorporated by reference in its entirety.

The present disclosure relates generally to communication techniques and more specifically to a system for deploying Voice over Internet Protocol (VoIP) services.

BACKGROUND

Although many consumers have come to depend on Internet services, the uptake of VoIP services has been slow. Part of the reason for this is that consumers are comfortable with the quality and cost of Public Switched Telephone Network (PSTN) services. Consequently, the value proposition to transition from PSTN to VoIP services is not as apparent to some consumers as it was to subscribe to Internet services to browse, exchange, and consume a vast supply of content.

A need therefore arises for a system for deploying VoIP services.

DETAILED DESCRIPTION

Embodiments in accordance with the present disclosure provide a system for deploying VoIP services.

In one embodiment of the present disclosure, a computer-readable storage medium can have computer instructions for receiving a Session Initiation Protocol (SIP) message from a Call Session Control Function (CSCF) associated with a call initiated by an originating communication device requesting communications with a terminating communication device. The CSCF can operate in an Internet Protocol Multimedia Subsystem (IMS) network. The storage medium can also have computer instructions for obtaining a Uniform Resource Identifier (URI) of an advertisement message, and submitting the URI to the CSCF for obtaining the advertisement message. The CSCF can establish a Real-Time Protocol (RTP) connection for presenting the advertisement message at the originating communication device in place of a ringback tone associated with a call directed to the terminating communication device.

In another embodiment of the present disclosure, a CSCF can have a controller element to receive a SIP message from an originating communication device requesting communications with a terminating communication device, and establish an Internet Protocol (IP) connection between the originating communication device and an advertisement media system to present at the originating communication device an advertisement message that replaces a ringback tone associated with the terminating communication device.

In another embodiment of the present disclosure, a computer-readable storage medium in an advertisement media system can have computer instructions for presenting an advertisement message over an IP connection established by a CSCF between an originating communication device and the advertisement media system to replace a ringback tone associated with a call from the originating communication device directed to a terminating communication device.

In another embodiment of the present disclosure, an originating communication device can have a controller element to transmit to a CSCF a SIP message associated with a call directed to a terminating communication device, and present in whole or in part an advertisement message received from an advertisement media system over an IP connection established by the CSCF that replaces a ringback tone of the terminating communication device.

Figure 1:
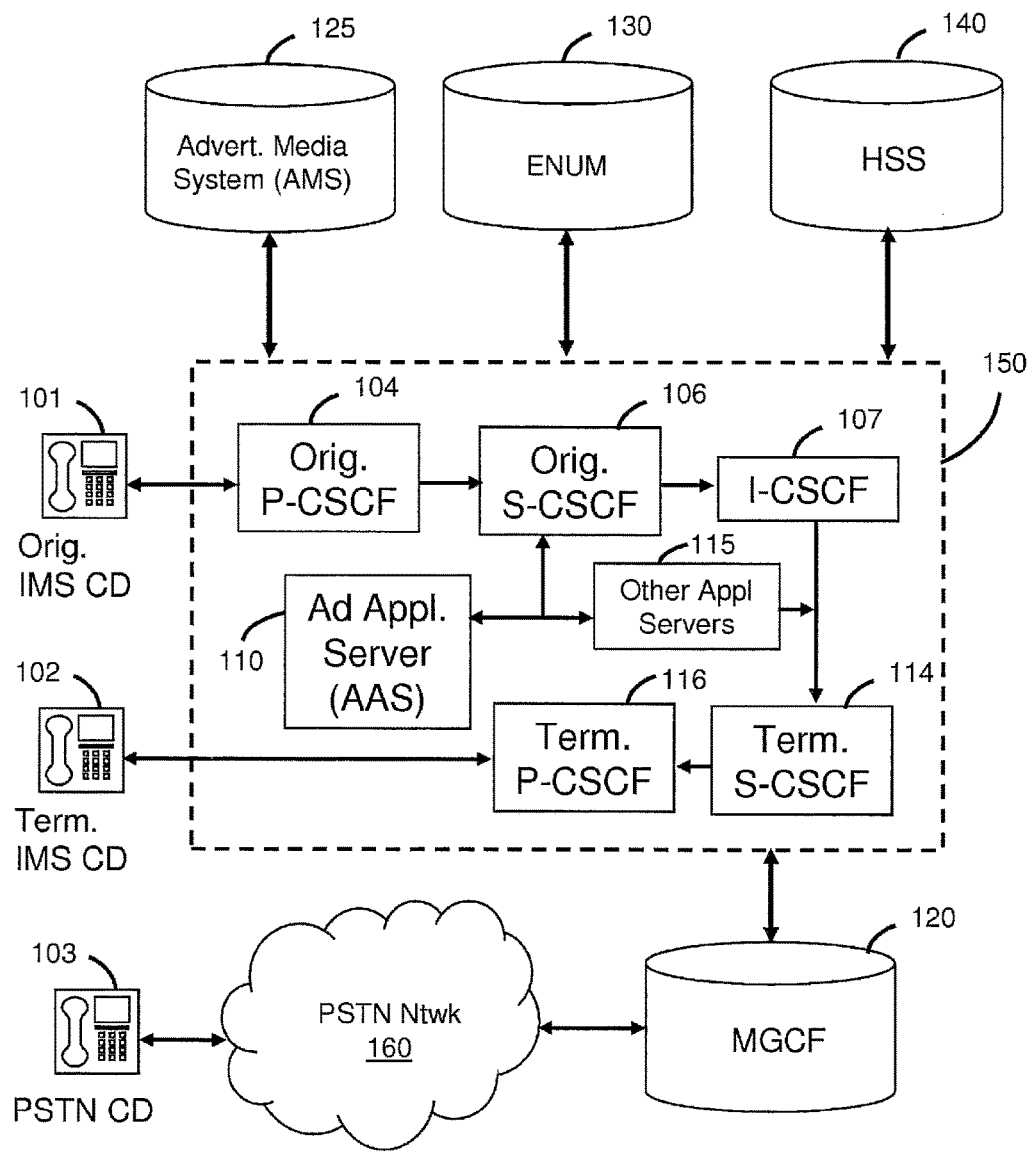
FIG. 1 depicts an exemplary embodiment of a communication system.

FIG. 1 depicts an exemplary communication system 100. The communication 100 can comprise an Advertisement Media System (AMS) 125, a Home Subscriber Server (HSS) 140, a tElephone NUmber Mapping (ENUM) server 130, and network elements of an IMS network 150. The IMS network 150 can be coupled to IMS compliant communication devices (CD) 101, 102 or a PSTN CD 103 using a Media Gateway Control Function (MGCF) 120 that connects the call through a common PSTN network 160.

IMS CDs 101, 102 register with the IMS network 150 by contacting a Proxy Call Session Control Function (P-CSCF) which communicates with a corresponding Serving CSCF (S-CSCF) to register the CDs with an Authentication, Authorization and Accounting (AAA) support by the HSS 140. To accomplish a communication session between CDs, an originating IMS CD 101 can submit a SIP INVITE message to an originating P-CSCF 104 which communicates with a corresponding originating S-CSCF 106. The originating S-CSCF 106 can submit the SIP INVITE message to an application server (AS) such as reference 115 that can provide a variety of services to IMS subscribers. For example, the application server 115 can be used to perform originating treatment functions on the calling party number received by the originating S-CSCF 106 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 106 can submit queries to the ENUM system 130 to translate an E.164 telephone number to a SIP Uniform Resource Identifier (URI) if the targeted communication device is IMS compliant. If the targeted communication device is a PSTN device, the ENUM system 130 will respond with an unsuccessful query and the S-CSCF 106 will forward the call to the MGCF 120 via a Breakout Gateway Control Function (not shown).

When the ENUM server 130 returns a SIP URI, the SIP URI is used by an Interrogating CSCF (I-CSCF) 107 to submit a query to the HSS 140 to identify a terminating S-CSCF 114 associated with a terminating IMS CD such as reference 102. Once identified, the I-CSCF 107 can submit the SIP INVITE to the terminating S-CSCF 114 which can call on an application server similar to reference 115 to perform the originating treatment telephony functions described earlier. The terminating S-CSCF 114 can then identify a terminating P-CSCF 116 associated with the terminating CD 102. The P-CSCF 116 then signals the CD 102 to establish communications. The aforementioned process is symmetrical. Accordingly, the terms "originating" and "terminating" in FIG. 1 can be interchanged.

The IMS network 150 can also have an Advertisement Application Server (AAS) 110 that can be used to identify advertisement messages in the AMS 125 for supporting in some instances free Voice over IP (VoIP) services. The AMS 125 can comprise a media server that manages by way of common computing and communication technologies advertisement messages for presentation at an originating IMS CD 101. The advertisement messages can be sponsored by third party merchants of goods or services, which pay service fees to an operator of the IMS network 150 or a broker associated therewith for presenting said messages to corresponding CDs in the operator's IMS network.

Figure 2:
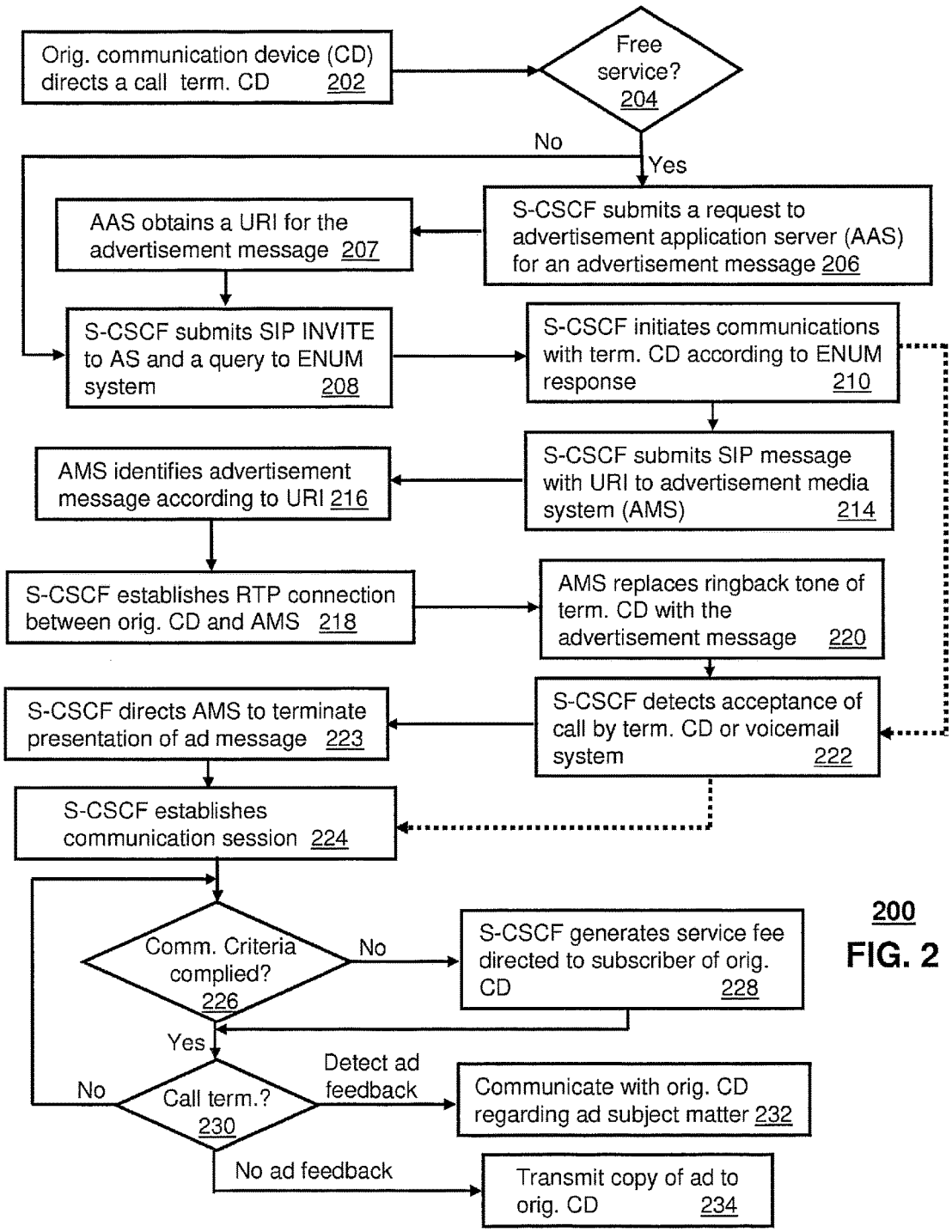
FIG. 2 depicts an exemplary method operating in portions of the communication system.

FIG. 2 depicts an exemplary method 200 operating in portions of the communication system 100. Method 200 begins with step 202 in which an originating IMS CD 101 directs a call to a terminating IMS CD 102 or PSTN CD 103. The call can represent a SIP INVITE message conveyed to the originating P-CSCF 104 which forwards it to the originating S-CSCF 106. The originating S-CSCF 106 can have stored in its cache memory a service profile received from the HSS 140 for the originating IMS CD 101 at the time it was registered with the IMS network 150. The service profile can indicate among other things the type of services subscribed to by the originating IMS CD 101. One or more initial Filter Criteria (iFC) can be included in the service profile which can direct the originating S-CSCF 106 according to various business model criteria. For example, the iFC can indicate to the originating S-CSCF 106 in step 204 whether the originating IMS CD 101 is to be provided with an advertisement message in place of the Ringback tone. The iFC in this example can serve as an indication that the calling party is a free service subscriber if the business model chosen by the service provider of the IMS network 150 provides free VoIP services to subscribers who accept an advertisement message in place of a ringback tone.

If the services associated with the originating CD 101 are for a free service subscriber, the S-CSCF 106 can proceed to step 206 where it submits a request to the AAS 110 to obtain in step 207 a URI of an advertisement message. The advertisement message can be an audio and/or visual message that can be presented by way of a user interface (e.g., display and/or audio system) of the originating IMS CD 101. The request can include a calling party number, a geographic location of the originating IMS CD 101, and/or demographic information about a subscriber of the originating IMS CD. The calling party number can be retrieved from the SIP INVITE and can be used by the AAS 110 to determine an advertisement message.

Alternatively, or in combination, a location of the originating IMS CD 101 can be derived from triangulation techniques as a geographic area, or GPS coordinates supplied by a GPS receiver of the originating IMS CD 101. The location information can be associated with retail establishments local to the originating IMS CD 101 to determine the advertisement message. In yet another embodiment, demographic information retrieved from subscription information retrieved for example from the HSS 140 for a subscriber of the originating IMS CD 101 can be used to identify the advertisement message. The AAS 110 can use the aforementioned embodiments to more or less target advertisements messages to the potential needs or interests of a subscriber of the originating IMS CD 102.

After the AAS 110 supplies a URI for a select advertisement message, the originating S-CSCF 106 begins the communication process with the terminating CD by submitting in step 208 the SIP INVITE to another AS 115 to perform originating treatment functions as described earlier. Additionally, the originating S-CSCF 106 submits a query to the ENUM system 130 including an E.164 called party number retrieved from the SIP INVITE message. In step 210, the originating S-CSCF 106 initiates communications with the terminating CD according to an ENUM response supplied by the ENUM system 130. In one embodiment, the ENUM response can indicate that the called party number corresponds to another IMS compliant CD (102). In this case, the ENUM response includes a SIP URI which is conveyed to an Interrogating CSCF (I-CSCF). The I-CSCF 107 communicates with the HSS 140 to identify a terminating S-CSCF associated with the terminating IMS CD 102. For illustration purposes, the terminating S-CSCF will be assumed to be reference number 114.

Once identified, the SIP INVITE is conveyed to the terminating S-CSCF 114 by the I-CSCF 107. The terminating S-CSCF 114 can call on other application servers similar to reference 115 to invoke other telephony services of the called party CD before it is alerted of the incoming call. The terminating S-CSCF 114 identifies from the called party number the terminating P-CSCF associated with the terminating IMS CD 102. For illustration purposes the terminating P-CSCF will be assumed to be reference 116. Upon receiving the SIP INVITE from the terminating S-CSCF 116, the terminating P-CSCF 116 signals the terminating IMS CD 102 of the impending call initiated by the originating IMS CD 102. This signal can represent a ringing sound at the terminating IMS CD 102.

The foregoing steps describe a process for IMS to IMS CD communications. Referring back to step 210, if on the other hand the ENUM response indicated the terminating CD is not an IMS compliant CD, then the originating S-CSCF 106 forwards the SIP INVITE to the MGCF 120 (via a BGCF) which contacts the PSTN CD 103 through the PSTN network 160 utilizing conventional signaling techniques (e.g., SS7).

The originating S-CSCF 106 in step 214 submits a SIP message with the URI supplied by the AAS 110 in step 207 to the AMS 125 to identify the advertisement message in step 216. Once the originating S-CSCF 106 receives a ringback message (e.g., SIP 180 Ringing) from the terminating CD (102 or 103), the originating S-CSCF establishes in step 218 an IP connection such as a real-time protocol or RTP connection between the originating IMS CD 101 and the AMS 125. The RTP connection is utilized by the AMS 125 in step 220 to stream the advertisement message to the originating IMS CD 101 in place of the ringback tone that is typically generated by the originating CD upon receiving a Ringback message (e.g., SIP 180 ringing). Consequently, a subscriber of the originating IMS CD 101 does not hear the ringback tone supplied by the terminating CD, but rather hears and/or sees the advertisement message on a user interface (display and/or audio system) of the originating IMS CD 101.

Upon the originating S-CSCF 106 detecting in step 222 an acceptance of the call by the terminating CD (102 or 103) or a common voicemail system that accepts calls when the terminating CD is unresponsive, the originating S-CSCF 106 proceeds to step 223 where it directs the AMS 125 to terminate presentation of the advertisement message and establishes in step 224 by common means communications between the originating IMS CD 101 and the terminating CD (102, 103).

Once a communication session has been established, the originating S-CSCF 106 can be programmed in step 226 to determine whether the communication session complies with predetermined communication criteria. For example, if the communication session exceeds a duration threshold (e.g., 1 hour), the originating S-CSCF 106 can be programmed to generate in step 228 a service fee directed to a subscriber of the originating IMS CD 101. Thus, services are free so long as the communication criteria are met. Similarly, if the call is a long-distance or international call, fees can be generated in step 228. Also, if the call is directed to a terminating CD which is not served by the service provider of the IMS network 150, the S-CSCF 106 can be programmed to generate a fee in step 228. It follows that the operator of the IMS network can define any criteria for converting a free communication service to a paying service.

Whether or not the communication criteria of step 226 are satisfied, the originating S-CSCF 106 proceeds to step 230 where it checks for a terminating signal associated with the communication session generated by either the originating or terminating CD 101, 102 or 103. If the call has not been terminated, the originating S-CSCF 106 returns to step 226. Otherwise, it proceeds to step 232 when it detects from the originating IMS CD 102 a signal from the subscriber of the originating IMS CD indicating an interest in the subject matter of the advertisement message. The signal can be represented by one or more DTMF tones generated by keypad depressions of a user interface of the originating IMS CD 102 (e.g., "*", "1"). Alternatively, the signal can represent a speech response by the subscriber of the originating IMS CD 101 (e.g., advertisement message says: "Press 1 or say yes if you would like to hear more about this message after your call is completed"; subscriber says: "yes").

When a feedback signal is detected, the originating S-CSCF 106 proceeds to step 232 after the call has been terminated and establishes communications with the originating IMS CD 101 by common means to supply more information about the advertisement subject matter. The call established by the S-CSCF 106 can be between a human agent associated with a sponsor of the advertisement message, or an automated system such as an interactive voice response system (IVR) that presents the subscriber of the originating IMS CD 101 a call flow tailored to the advertisement message. Alternatively, if no feedback signal is detected, a copy of the advertisement message and/or a message with responsive links (e.g., URLs) can be sent to the originating IMS CD 101 in step 234 as an SMS, MMS or email message.

In yet another embodiment, the originating IMS CD 101 as directed by its user can submit another call request (e.g., a SIP INVITE message) with a special called party number (e.g., a "100"-code) after the call is terminated to indicate an interest in the advertisement message. The originating S-CSCF 106 can forward the call (e.g., the SIP INVITE message) to the AAS 110. The AAS 110 can recognize the originating IMS CD 101 from its calling party number and can identify the previous advertisement message played for this calling party from a cached record of the URI. The AAS 110 can then direct the AMS 125 to play the advertisement message associated with the URI to the originating CD 101 again, or can send an SMS or MMS message with the URI of the advertisement message to the originating IMS CD 101.

Referring back to step 204, if the services associated with the originating IMS CD 101 are for a paying subscriber (i.e., the iFC does not instruct the originating S-CSCF 106 to replace the ringback tone with an advertisement message), the originating S-CSCF can proceed to steps 208, 210, 222, and 224 to process the call as a regular IMS call without advertisement messaging as described above.

Figure 3:
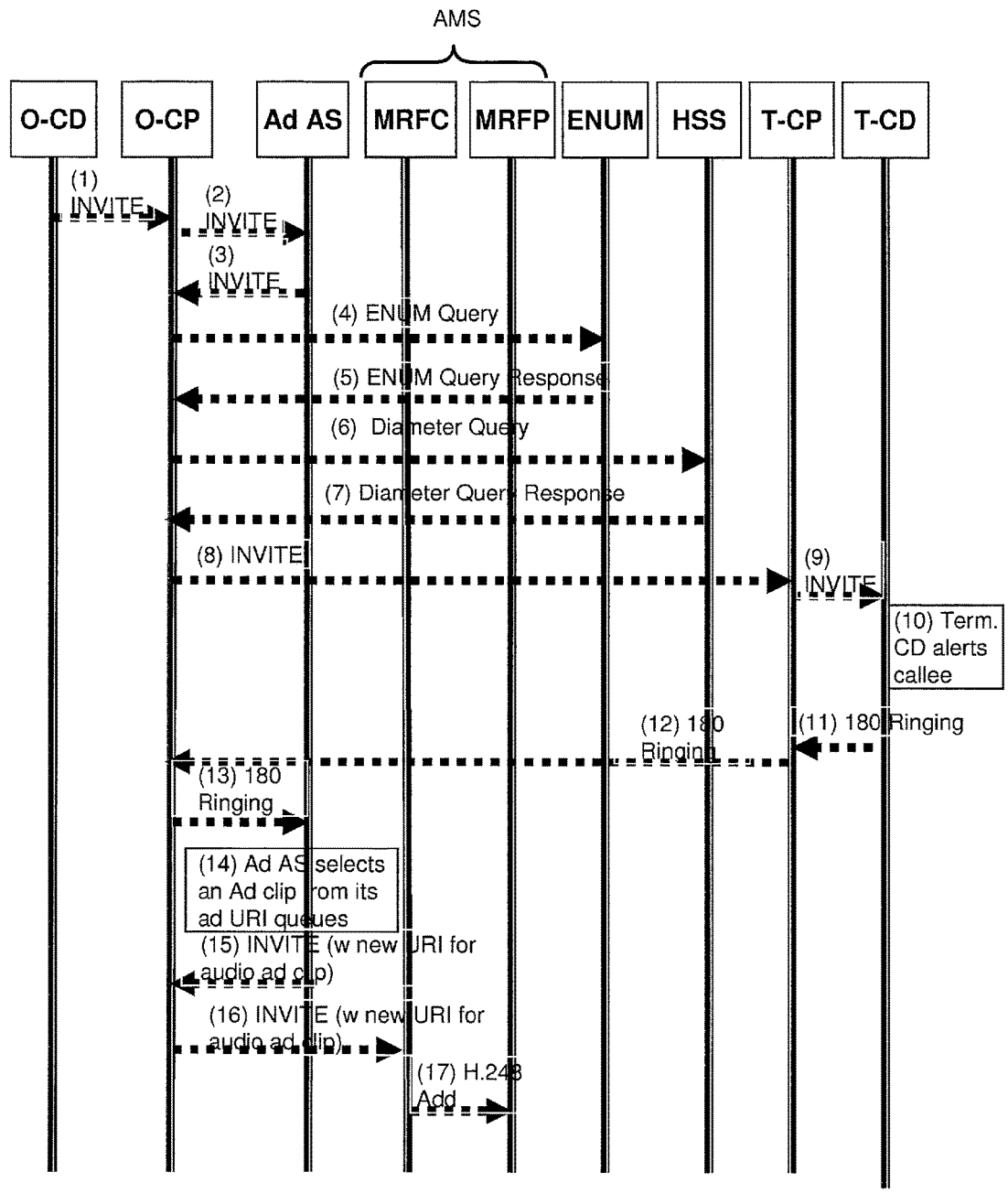
FIGS. 3-4 depict exemplary flow diagrams of an embodiment of the method presented in FIG. 2.
Figure 4:
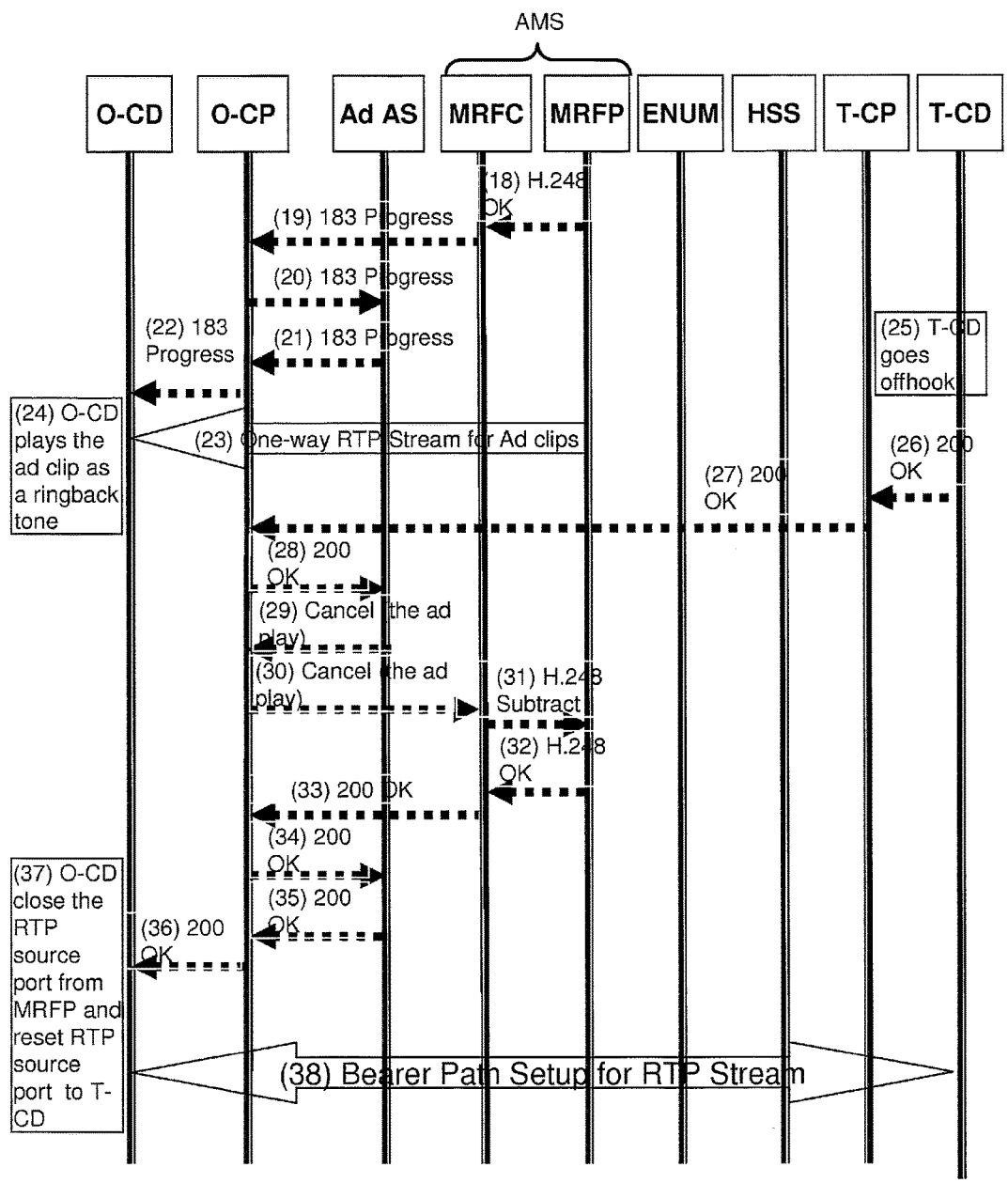

FIGS. 3-4 depict an exemplary flow diagram of an embodiment of method 200.

Upon reviewing the embodiments disclosed, it would be evident to an artisan with ordinary skill in the art that said embodiments can be modified, reduced, or enhanced without departing from the scope and spirit of the claims described below. For example, to avoid a premature termination of a presentation of the advertisement message, the AAS 110 can direct the originating S-CSCF 106 to postpone transmitting the SIP INVITE to the terminating CD until after the advertisement message has been played for a prescribed time. For each advertisement message, the originating S-CSCF 106 can also be programmed to generate a service fee which is directed to a sponsor of the advertisement message. In yet another embodiment, the originating S-CSCF 106 can interrupt communications between the parties of the originating and terminating CDs with one or more presentations of the advertisement message. In another embodiment, step 204 can be eliminated and the advertisement messaging process described by method 200 can be applied in whole or in part to some or all calls received by the IMS network 150.

Other suitable modifications can be applied to the present disclosure without departing from the scope of the claims below. Accordingly, the reader is directed to the claims for a fuller understanding of the breadth and scope of the present disclosure.

Figure 5:
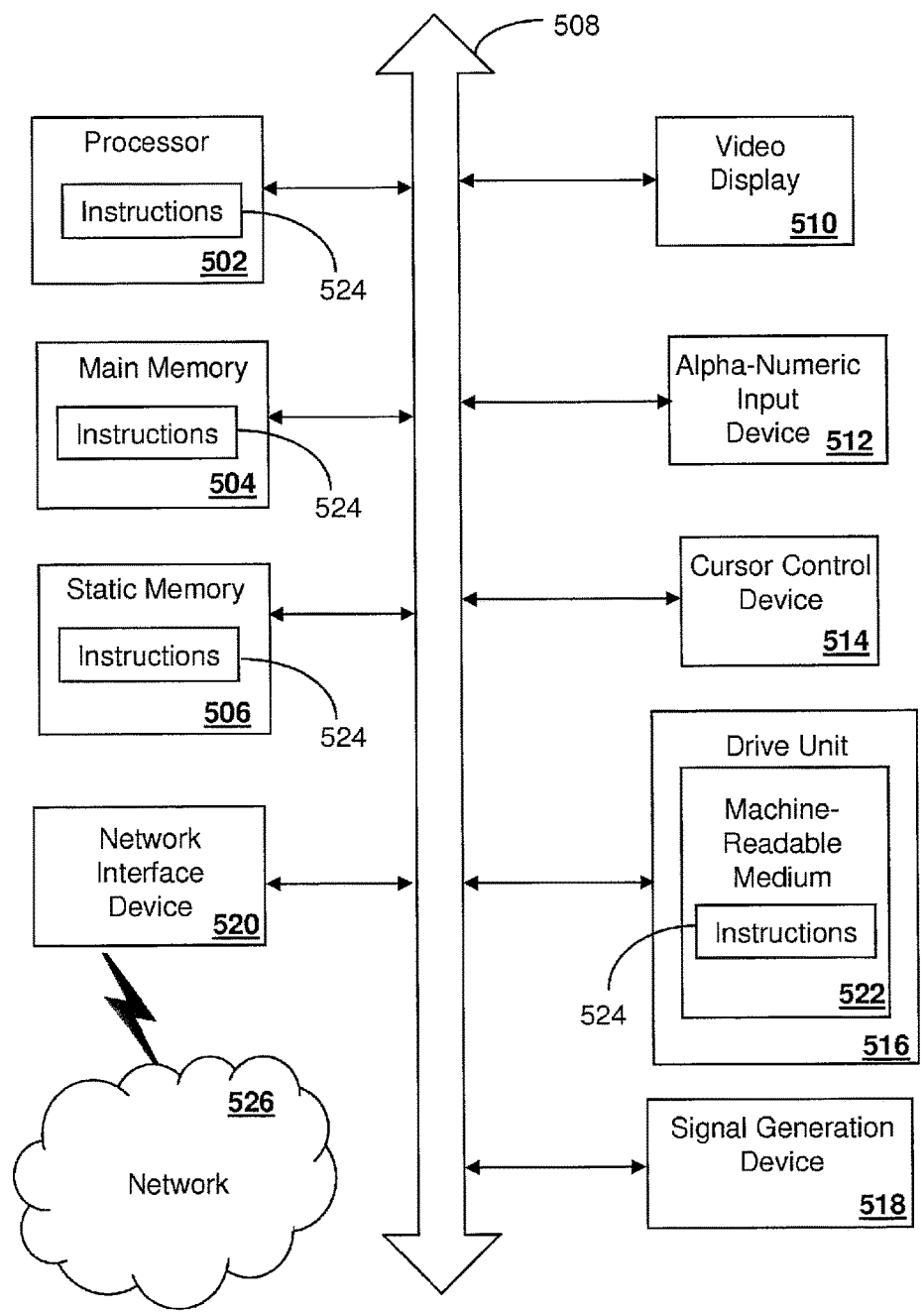
FIG. 5 depicts an exemplary diagrammatic representation of a machine in the form of a computer system within which a set of instructions, when executed, may cause the machine to perform any plurality of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a mass storage medium 516, a signal generation device 518 (e.g., a speaker or remote control) and a network interface device 520.

The mass storage medium 516 may include a computer-readable storage medium 522 on which is stored one or more sets of instructions (e.g., software 524) embodying any one or more of the methodologies or functions described herein, including those methods illustrated above. The computer-readable storage medium 522 can be an electromechanical medium such as a common disk drive, or a mass storage medium with no moving parts such as Flash or like non-volatile memories. The instructions 524 may also reside, completely or at least partially, within the main memory 504, the static memory 506, and/or within the processor 502 during execution thereof by the computer system 500. The main memory 504 and the processor 502 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the computer-readable storage medium 522 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. .sctn.1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium storing a plurality of instructions which, when executed by a processor, cause the processor to perform operations, the operations comprising:

receiving a session initiation protocol message from a call session control function associated with a call initiated by an originating communication device requesting communications with a terminating communication device, wherein the call session control function operates in an internet protocol multimedia subsystem network;

obtaining a uniform resource identifier of an advertisement message, wherein the advertisement message is selected based on demographic information retrieved from subscription information retrieved from a home subscriber server, wherein the home subscriber server provides an initial filter criterion that indicates that the originating communication device is to be provided with the advertisement message in place of a ringback tone when the originating communication device is associated with a non-paying subscriber;

submitting the uniform resource identifier to the call session control function for obtaining the advertisement message, wherein the call session control function establishes a real-time protocol connection for presenting the advertisement message at the originating communication device in place of the ringback tone associated with the call directed to the terminating communication device, wherein the presenting the advertisement message is completed first before the session initiation protocol message is transmitted for establishing the call to a terminating call session control function associated with the terminating communication device;

presenting an option to hear more information about the advertisement message after the call is completed;

receiving an indication to supply more information; and supplying more information about the advertisement message after the call is completed.

2. The non-transitory computer-readable storage medium of claim 1, wherein the advertisement message is presented by an advertisement media system, and wherein the advertisement message corresponds to an audible message.

3. The non-transitory computer-readable storage medium of claim 1, wherein the call session control function comprises a proxy-call session control function.

4. The non-transitory computer-readable storage medium of claim 1, wherein the non-transitory computer-readable storage medium operates in an advertisement application server, and wherein the non-transitory computer-readable storage medium further comprises storing the uniform resource identifier of the advertisement message for subsequent reuse.

5. The non-transitory computer-readable storage medium of claim 1, the operations further comprising:

generating a service fee for a presentation of the advertisement message at the originating communication device; and directing the service fee to a sponsor of the advertisement message.

6. The non-transitory computer-readable storage medium of claim 1, the operations further comprising:

obtaining the uniform resource identifier for the advertisement message according to a location of the originating communication device.

7. The non-transitory computer-readable storage medium of claim 6, wherein the location is supplied by the call session control function, and wherein the location comprises location coordinates of the originating communication device.

8. The non-transitory computer-readable storage medium of claim 1, the operations further comprising:

receiving from the call session control function demographic information associated with the non-paying subscriber of the originating communication device; and obtaining the uniform resource identifier of the advertisement message according to the demographic information.

9. The non-transitory computer-readable storage medium of claim 1, the operations further comprising:

receiving an indication that the non-paying subscriber of the originating communication device is interested in a subject matter promoted by the advertisement message.

10. The non-transitory computer-readable storage medium of claim 9, wherein the indication is received in another session initiation protocol message having a character entered by the non-paying subscriber by way of a user interface of the originating communication device.

11. The non-transitory computer-readable storage medium of claim 10, the operations further comprising:

transmitting to the originating communication device a message with a selectable communication link; and processing a feedback from the non-paying subscriber of the originating communication device according to a selection of the selectable communication link.

12. The non-transitory computer-readable storage medium of claim 10, the operations further comprising:

directing the call session control function to establish communications between the originating communication device and an agent of a sponsor of the advertisement message upon the call session control function detecting that communications have terminated between the originating communication device and the terminating communication device.

13. An apparatus comprising a call session control function, comprising:

a processor; and a computer-readable medium storing a plurality of instructions which, when executed by the processor, cause the processor to perform operations, the operations comprising:

receiving a session initiation protocol message from an originating communication device requesting communications with a terminating communication device;

establishing a real-time protocol connection between the originating communication device and an advertisement media system;

receiving a uniform resource identifier of an advertisement message, wherein the advertisement message is selected based on demographic information retrieved from subscription information retrieved from a home subscriber server, wherein the home subscriber server provides an initial filter criterion that indicates that the originating communication device is to be provided with the advertisement message in place of a ringback tone when the originating communication device is associated with a non-paying subscriber;

submitting to the advertisement media system the uniform resource identifier to present at the originating communication device the advertisement message that replaces the ringback tone associated with the communications with the terminating communication device, wherein the presenting the advertisement message is completed first before the session initiation protocol message is transmitted for establishing a call to a terminating call session control function associated with the terminating communication device;

presenting an option to hear more information about the advertisement message after the call is completed;

receiving an indication to supply more information; and supplying more information about the advertisement message after the call is completed.

14. The apparatus of claim 13, wherein the advertisement message is presented to the originating communication device via the real-time protocol connection.

15. The apparatus of claim 13, the operations further comprising:

submitting a telephone number mapping query to a telephone number mapping system with a called party number retrieved from the session initiation protocol message; and initiating the call with the terminating communication device according to a response received from the telephone number mapping system.

16. The apparatus of claim 13, wherein the advertisement message corresponds to an audible message.

17. The apparatus of claim 13, wherein the call session control function comprises a proxy-call session control function.

18. The apparatus of claim 13, the operations further comprising:

establishing communications between the originating communication device and the terminating communication device upon detecting an acceptance of the call by the terminating communication device;

monitoring a duration of communications between the originating communication device and the terminating communication device; and generating a service fee directed to the non-paying subscriber of the originating communication device when communications between the originating communication device and the terminating communication device exceeds a duration threshold.

19. A communication device, comprising:

a processor; and a computer-readable medium storing a plurality of instructions which, when executed by the processor, cause the processor to perform operations, the operations comprising:

transmitting to a call session control function a session initiation protocol message associated with a call directed to a terminating communication device;

presenting an advertisement message received from an advertisement media system over a real-time protocol connection established by the call session control function using a uniform resource identifier submitted to the call session control function that replaces a ringback tone of the terminating communication device, wherein the advertisement message is selected based on demographic information retrieved from subscription information retrieved from a home subscriber server, wherein the home subscriber server provides an initial filter criterion that indicates that the communication device is to be provided with the advertisement message in place of the ringback tone when the originating communication device is associated with a non-paying subscriber, wherein the presenting the advertisement message is completed first before the session initiation protocol message for establishing the call is transmitted by the call session control function to a terminating call session control function associated with the terminating communication device;

presenting an option to hear more information about the advertisement message after the call is completed;

receiving an indication to supply more information; and supplying more information about the advertisement message after the call is completed.

20. The communication device of claim 19, wherein the call session control function receives a service profile from the home subscriber server that indicates the communication device has a free subscription for communication services subject to presentation of advertisement messages at the communication device.

* * * * *